(12) United States Patent
Zhao et al.

(10) Patent No.: US 12,514,176 B2
(45) Date of Patent: Jan. 6, 2026

(54) METHOD AND SYSTEM FOR GENERATING VARIABLE RATE IRRIGATION (VRI) PRESCRIPTION MAP FOR LARGE SPRINKLER IRRIGATION SYSTEM

(71) Applicant: China Institute of Water Resources and Hydropower Research, Beijing (CN)

(72) Inventors: Weixia Zhao, Beijing (CN); Baozhong Zhang, Beijing (CN); Zhijie Shan, Beijing (CN); Jiusheng Li, Beijing (CN); Minne Zhang, Beijing (CN); Changxin Zhu, Beijing (CN); Yanfeng Li, Beijing (CN)

( * ) Notice: Subject to any disclaimer, the term of this patent is extended or adjusted under 35 U.S.C. 154(b) by 394 days.

(21) Appl. No.: 18/108,026

(22) Filed: Feb. 10, 2023

(65) Prior Publication Data

US 2024/0122135 A1   Apr. 18, 2024

(30) Foreign Application Priority Data

Oct. 12, 2022   (CN) .......................... 202211245118.1

(51) Int. Cl.
*A01G 25/16* (2006.01)
*A01G 25/09* (2006.01)
*G05B 19/042* (2006.01)

(52) U.S. Cl.
CPC ......... *A01G 25/167* (2013.01); *A01G 25/092* (2013.01); *G05B 19/042* (2013.01); *G05B 2219/2625* (2013.01)

(58) Field of Classification Search
CPC .... A01G 25/167; A01G 25/092; A01G 25/16; G05B 19/042; G05B 2219/2625; Y02A 40/22
See application file for complete search history.

(56) References Cited

U.S. PATENT DOCUMENTS

2017/0359974 A1* 12/2017 Whalley .............. A01G 25/162

FOREIGN PATENT DOCUMENTS

CN                112772098 A    *   5/2021

* cited by examiner

*Primary Examiner* — Chad G Erdman

(57) ABSTRACT

A method and system for generating a variable rate irrigation (VRI) prescription map for a large sprinkler irrigation system is provided. The method includes: determining a minimum length of a VRI management zone along a truss direction of the sprinkler irrigation system; determining a minimum angle of the VRI management zone along a travel direction of the sprinkler irrigation system; dividing the VRI management zone to generate a VRI management zoning map; determining, according to a basic irrigation amount of VRI management and a spatial distribution map of crop water deficit or a spatial distribution map of soil water holding capacity (SWHC), an irrigation quota of each management sub-zone; and generating, according to a distribution map of irrigation quotas of all management sub-zones in combination with a travel speed of the sprinkler irrigation system and a duty cycle of a solenoid valve, the VRI prescription map.

9 Claims, 3 Drawing Sheets

METHOD AND SYSTEM FOR GENERATING VARIABLE RATE IRRIGATION (VRI) PRESCRIPTION MAP FOR LARGE SPRINKLER IRRIGATION SYSTEM

CROSS REFERENCE TO THE RELATED APPLICATIONS

This application is based upon and claims priority to Chinese Patent Application No. 202211245118.1, filed on Oct. 12, 2022, the entire contents of which are incorporated herein by reference.

TECHNICAL FIELD

The present disclosure relates to the technical field of agricultural information measurement and agricultural irrigation, particularly to a method and system for generating a variable rate irrigation (VRI) prescription map for a large sprinkler irrigation system.

BACKGROUND

VRI prescription map refers to a set of coding instructions used to control the travel speed of the sprinkler irrigation system and the specific irrigation depth in each management zone. It is a method of implementing appropriate and precision water management according to the spatial variability of field water deficit. Dividing the field into different management zones according to the spatial distribution map of water deficit is the basis for generating the VRI prescription map.

At present, there are three main methods to acquire the spatial distribution map of water deficit. (1) A grid sampling method is utilized to acquire scatter values characterizing soil properties. (2) A ground-based sensor system is utilized to acquire the linearly distributed scatter values of canopy temperature or soil electrical conductivity (EC). (3) An unmanned aerial vehicle (UAV)-based camera is utilized to acquire a large number of high-resolution (the resolution of a UAV-based thermal imaging camera is about 10 cm/pixel within the safe altitude of 120 m) scatter values of canopy temperature, vegetation index or other parameters. In the first two methods, after the scatter values are acquired, the interpolation tool of ArcGIS software is needed to acquire the spatial distribution map of water deficit. While a large number of single images acquired by the UAV-based system need to be directly generated into the spatial distribution map of water deficit through professional image stitching software. The spatial distribution maps of water deficit acquired by the grid sampling method and the ground-based sensor system have a high degree of clustering. In contrast, the spatial distribution map of water deficit acquired by the UAV-based system has much numerical discretization, making it hard for management zoning.

Therefore, for different acquisition methods of the spatial distribution maps of water deficit, it is hard to reasonably perform management zoning based on the spatial distribution maps of water deficit acquired by different acquisition methods under the same control platform, making it hard for standardized development and application of a VRI management decision support system.

SUMMARY

In order to overcome the shortcomings of the prior art, the present disclosure provides a method and system for generating a variable rate irrigation (VRI) prescription map for a large sprinkler irrigation system.

In order to achieve the objective of the present disclosure, the present disclosure adopts the following technical solutions.

A first aspect of the present disclosure proposes a method for generating a VRI prescription map for a large sprinkler irrigation system, including the following steps:

determining, according to sprinkler information of the sprinkler irrigation system, a minimum length of a VRI management zone along a truss direction of the sprinkler irrigation system;

determining, according to a distribution range of a spraying amount of the sprinkler irrigation system, a minimum angle of the VRI management zone along a travel direction of the sprinkler irrigation system;

dividing, according to the minimum length of the VRI management zone along the truss direction of the sprinkler irrigation system and the minimum angle of the VRI management zone along the travel direction of the sprinkler irrigation system, the VRI management zone to generate a VRI management zoning map; and determining, according to a basic irrigation amount of VRI management and a spatial distribution map of crop water deficit or a spatial distribution map of soil water holding capacity (SWHC), an irrigation quota of each management sub-zone; and generating, according to a distribution map of irrigation quotas of all management sub-zones in combination with a travel speed of the sprinkler irrigation system and a duty cycle of a solenoid valve, the VRI prescription map.

The above solution has the following beneficial effects.

The above solution provides a VRI management zoning method and VRI prescription map generation method suitable for different data sources, providing a basic platform for the standardized development and application of a VRI management decision support system.

Optionally, the determining, according to sprinkler information of the sprinkler irrigation system, a minimum length of a VRI management zone along a truss direction of the sprinkler irrigation system specifically includes:

calculating, according to a sprinkler spacing of the sprinkler irrigation system and a spraying radius of a largest sprinkler, the minimum length of the VRI management zone along the truss direction of the sprinkler irrigation system:

$$d = s \times \mathrm{ROUNDUP}(r_{max}/s, 0)$$

where d denotes the minimum length of the VRI management zone along the truss direction of the sprinkler irrigation system, s denotes the sprinkler spacing of the sprinkler irrigation system, $r_{max}$ denotes the spraying radius of the largest sprinkler, and ROUNDUP(·) denotes a function of rounding up to zero.

The above solution has the following beneficial effects.

The above solution provides a method to determine the minimum length of the VRI management zone along the truss direction of the sprinkler irrigation system with equidistant sprinklers, ensuring the uniformity of irrigation along the truss direction of the sprinkler irrigation system during VRI management.

Optionally, the determining, according to a distribution range of a spraying amount of the sprinkler irrigation system, a minimum angle of the VRI management zone along a travel direction of the sprinkler irrigation system specifically includes:

calculating, according to a spraying radius of a farthest sprinkler of the sprinkler irrigation system from a center pivot and a distance between the farthest sprinkler from the center pivot and the center pivot, the minimum angle of the VRI management zone along the travel direction of the sprinkler irrigation system:

$$\theta = 2 \times \tan^{-1}\frac{r}{L}$$

where θ denotes the minimum angle of the VRI management zone along the travel direction of the sprinkler irrigation system, r denotes the spraying radius of the farthest sprinkler from the center pivot, and L denotes the distance between the farthest sprinkler from the center pivot and the center pivot.

The above solution has the following beneficial effects.

The above solution comprehensively considers the overall spraying range of the sprinkler irrigation system, and provides a method to determine the minimum angle along the travel direction of the sprinkler irrigation system, ensuring the uniformity of irrigation along the travel direction of the sprinkler irrigation system during VRI management.

Optionally, the dividing, according to the minimum length of the VRI management zone along the truss direction of the sprinkler irrigation system and the minimum angle of the VRI management zone along the travel direction of the sprinkler irrigation system, the VRI management zone to generate a VRI management zoning map specifically includes:

drawing, by centering on the center pivot of the sprinkler irrigation system, equidistant circles of a first quantity in the VRI management zone along the truss direction of the sprinkler irrigation system;

drawing equal-angle radii of a second quantity in the VRI management zone along the travel direction of the sprinkler irrigation system; and dividing, by the circles of the first quantity and the radii of the second quantity, the VRI management zone into minimum management sub-zones of a quantity equal to a product of the first quantity and the second quantity.

The above solution has the following beneficial effects.

The above solution provides a method to acquire a maximum quantity of management sub-zones under the condition of ensuring the irrigation uniformity in each minimum management sub-zone during VRI management.

Optionally, the first quantity is calculated as follows:

$$n = \text{ROUNDDOWN}(m/d, 0)$$

where n denotes the first quantity, m denotes a total quantity of sprinklers of the sprinkler irrigation system, d denotes the minimum length of the VRI management zone along the truss direction of the sprinkler irrigation system, and ROUNDDOWN(·) denotes a function of rounding down to zero.

The above solution has the following beneficial effects.

The above solution provides a method to acquire a maximum quantity of management sub-zones along the truss direction of the sprinkler irrigation system under the condition of ensuring the irrigation uniformity in each sub-zone.

Optionally, the second quantity is calculated as follows:

$$k = \text{ROUNDDOWN}(\alpha/\theta, 0)$$

where k denotes the second quantity, α denotes a travel angle corresponding to a control area of the sprinkler irrigation system, θ denotes the minimum angle of the VRI management zone along the travel direction of the sprinkler irrigation system, and ROUNDDOWN(·) denotes a function of rounding down to zero.

The above solution has the following beneficial effects.

The above solution provides a method to acquire a maximum quantity of management sub-zones along the travel direction of the sprinkler irrigation system under the condition of ensuring the irrigation uniformity in each sub-zone.

Optionally, the determining, according to a basic irrigation amount of VRI management and a spatial distribution map of crop water deficit or a spatial distribution map of SWHC, an irrigation quota of each management sub-zone and generating, according to a distribution map of irrigation quotas of all management sub-zones in combination with a travel speed of the sprinkler irrigation system and a duty cycle of a solenoid valve, the VRI prescription map specifically includes:

providing, according to an average clay content in the whole control area of the sprinkler irrigation system, a soil water sensor in a root zone of a crop;

starting irrigation when a soil water content measured by the soil water sensor reaches a lower limiting irrigation level, and calculating a water consumption of the crop in an interval between two irrigation times as the basic irrigation amount for VRI management;

generating, according to a field canopy temperature image acquired by an UAV-based thermal imaging system, the spatial distribution map of crop water deficit;

superimposing, according to coordinate positions, the spatial distribution map of crop water deficit and the VRI management zoning map by taking the VRI management zoning map as a base map;

clustering according to an average value of a water deficit index of each minimum management sub-zone, and calculating a product of an average value of upper and lower limits of each category of water deficit index and the basic irrigation amount as the irrigation quota of the management sub-zone;

determining, within a same sector angle along the travel direction of the sprinkler irrigation system, the travel speed of the sprinkler irrigation system according to a maximum irrigation quota of all the management sub-zones and the duty cycle of the solenoid valve according to the irrigation quota of other management sub-zone; and generating, according to the distribution map of irrigation quotas of all the management sub-zones in combination with the travel speed of the sprinkler irrigation system and the duty cycle of the solenoid valve, the VRI prescription map.

The above solution has the following beneficial effects.

The above solution provides a method to generate the VRI prescription map after the UAV-based thermal imaging system acquires the crop water deficit information, solving the problem that the UAV-based thermal imaging system fails to perform VRI management zoning due to the high spatial resolution.

Optionally, the determining, according to a basic irrigation amount of VRI management and a spatial distribution map of crop water deficit or a spatial distribution map of SWHC, an irrigation quota of each management sub-zone and generating, according to a distribution map of irrigation quotas of all management sub-zones in combination with a travel speed of the sprinkler irrigation system and a duty cycle of a solenoid valve, the VRI prescription map specifically includes:

providing, according to an average clay content in the whole control area of the sprinkler irrigation system, a soil water sensor in a root zone of a crop;

starting irrigation when a soil water content measured by the soil water sensor reaches a lower limiting irrigation level, and calculating a water consumption of the crop in an interval between two irrigation times as the basic irrigation amount for VRI management;

generating, according to linear scatter values of a canopy temperature acquired by an infrared temperature sensor system aboard the sprinkler irrigation system, the spatial distribution map of crop water deficit;

classifying the spatial distribution map of crop water deficit by a natural breakpoint method, and superimposing, according to coordinate positions, the spatial distribution map of crop water deficit and the VRI management zoning map by taking the VRI management zoning map as a base map;

determining whether each minimum management sub-zone belongs to a same category of water deficit; calculating, if yes, a product of an average value of upper and lower limits of a water deficit index and the basic irrigation amount as the irrigation quota of the minimum management sub-zone; and calculating, if not, the irrigation quota of the minimum management sub-zone according to a category of water deficit with a largest area proportion;

determining, within a same sector angle along the travel direction of the sprinkler irrigation system, the travel speed of the sprinkler irrigation system according to a maximum irrigation quota of all the management sub-zones and the duty cycle of the solenoid valve according to the irrigation quota of other management sub-zone; and generating, according to the distribution map of irrigation quotas of all the management sub-zones in combination with the travel speed of the sprinkler irrigation system and the duty cycle of the solenoid valve, the VRI prescription map.

The above solution has the following beneficial effects.

The above solution provides a VRI prescription map generation method for the infrared temperature sensor system aboard the sprinkler irrigation system. It solves the problem that a sampling density along the travel direction of the sprinkler irrigation system is much larger than a sampling density along the truss direction of the sprinkler irrigation system after interpolation of a water deficit index based on the canopy temperature, resulting in the small zone of some zones, so it is hard to divide the management zone and determine the irrigation quota.

Optionally, the determining, according to a basic irrigation amount of VRI management and a spatial distribution map of crop water deficit or a spatial distribution map of SWHC, an irrigation quota of each management sub-zone and generating, according to a distribution map of irrigation quotas of all management sub-zones in combination with a travel speed of the sprinkler irrigation system and a duty cycle of a solenoid valve, the VRI prescription map specifically includes:

acquiring, by a grid sampling method, a soil available water content (SAWC); and generating, according to the acquired SAWC, the spatial distribution map of the SWHC;

classifying the spatial distribution map of the SWHC by a natural breakpoint method, and superimposing, according to coordinate positions, the spatial distribution map of the SWHC and the VRI management zoning map by taking the VRI management zoning map as a base map;

defining a control area of a same category of SWHC by a management sub-zone occupied by the same category of SWHC; and providing, according to an average clay content in the control area, a soil water sensor in a root zone of a crop;

starting irrigation when a soil water content measured by the soil water sensor in any category of control area reaches a lower limiting irrigation level; and calculating, according to a difference between an upper limiting irrigation level and the measured soil water content, an irrigation quota of the control area;

determining whether each minimum management sub-zone belongs to a same category of SWHC; taking, if yes, the irrigation quota of the control area as the irrigation quota of the minimum management sub-zone; and taking, if not, the irrigation quota of a category of water deficit with a largest area proportion as the irrigation quota of the minimum management sub-zone;

determining, within a same sector angle along the travel direction of the sprinkler irrigation system, the travel speed of the sprinkler irrigation system according to a maximum irrigation quota of all the management sub-zones and the duty cycle of the solenoid valve according to the irrigation quota of other management sub-zone; and generating, according to the distribution map of irrigation quotas of all the management sub-zones in combination with the travel speed of the sprinkler irrigation system and the duty cycle of the solenoid valve, the VRI prescription map.

The above solution has the following beneficial effects.

The above solution provides a method to generate the VRI prescription map after acquiring the SWHC by the grid sampling method, solving the problem that it is hard to perform management zoning after interpolation of the SAWC index due to irregular boundary of the same type of field.

A second aspect of the present disclosure further proposes a system for generating a VRI prescription map for a large sprinkler irrigation system, including:

a minimum length determination module configured to determine, according to sprinkler information of the sprinkler irrigation system, a minimum length of a VRI management zone along a truss direction of the sprinkler irrigation system;

a minimum angle determination module configured to determine, according to a distribution range of a spraying amount of the sprinkler irrigation system, a minimum angle of the VRI management zone along a travel direction of the sprinkler irrigation system;

a VRI management zoning map generation module configured to divide, according to the minimum length of the VRI management zone along the truss direction of the sprinkler irrigation system and the minimum angle of the VRI management zone along the travel direction of the sprinkler irrigation system, the VRI management zone to generate a VRI management zoning map; and a VRI prescription map generation module configured to determine, according to a basic irrigation amount of VRI management and a spatial distribution map of crop water deficit or a spatial distribution map of SWHC, an irrigation quota of each management sub-zone; and generate, according to a distribution map of irrigation quotas of all management sub-zones in combination with a travel speed of the sprinkler irrigation system and a duty cycle of a solenoid valve, the VRI prescription map.

The above solution has the following beneficial effects.

The above solution provides a method to implement VRI management by integrating soil, crop, atmosphere, and information of the sprinkler irrigation system and solves the problem that it is hard to determine the irrigation time based on water deficit information inferred by the crop canopy temperature.

DETAILED DESCRIPTION OF THE EMBODIMENTS

The specific implementations of the present disclosure are described below to facilitate those skilled in the art to understand the present disclosure, but it should be clear that the present disclosure is not limited to the scope of the specific implementations. Various obvious changes made by those of ordinary skill in the art within the spirit and scope of the present disclosure defined by the appended claims should fall within the protection scope of the present disclosure.

Embodiment 1

Figure 1:
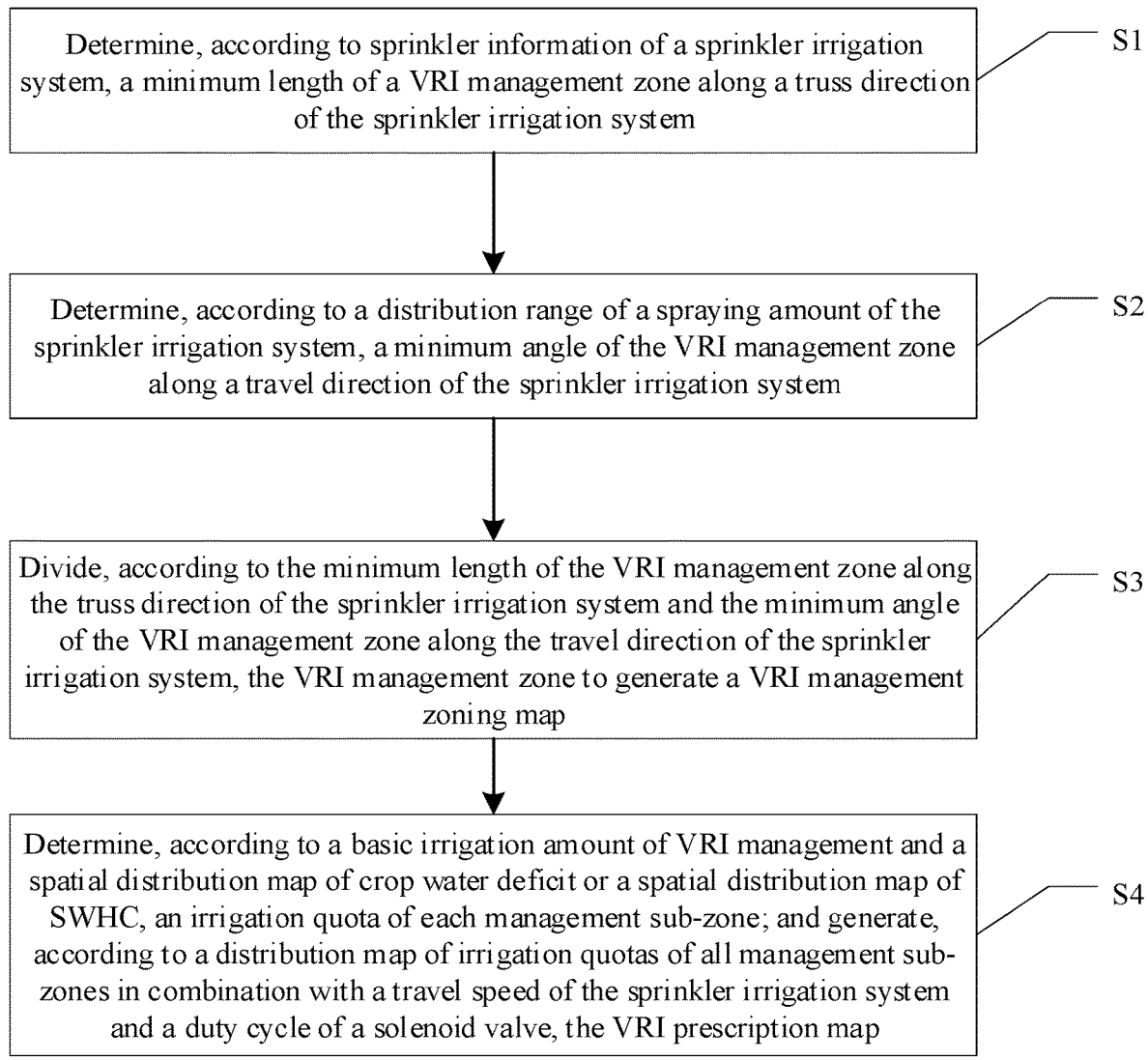
FIG. 1 is a flowchart of a method for generating a variable rate irrigation (VRI) prescription map for a large sprinkler irrigation system according to Embodiment 1 of the present disclosure.

As shown in FIG. 1, an embodiment of the present disclosure provides a method for generating a variable rate irrigation (VRI) prescription map for a large sprinkler irrigation system, including steps S1 to S4.

S1. According to sprinkler information of the sprinkler irrigation system, a minimum length of a VRI management zone along a truss direction of the sprinkler irrigation system is determined.

In an optional embodiment of the present disclosure, there are mainly two types of sprinklers used by the existing center pivot sprinkler irrigation systems at home and abroad, namely, R3000 rotary sprinklers with a spraying radius of 7.6-11.3 m and D3000 scattering sprinklers with a spraying radius of 2.45-6.1 m. The sprinklers are usually evenly spaced apart. The spacing varies by different manufacturers, but it is mainly in the range of 2.0-2.9 m. As the spraying radius of the R3000 sprinkler is larger, in order to meet the requirements of the design spraying intensity, the spacing between the sprinklers of 1-3 spans closest to the center pivot is 4.0-5.8 m, instead of 2.0-2.9 m. According to the sprinkler spacing and spraying radius, the irrigation depth of the center pivot sprinkler irrigation system with the D3000 scattering sprinklers is the result of the superimposition of the water amount of adjacent 2-3 sprinklers, and the irrigation depth of center pivot sprinkler irrigation system with the R3000 rotating sprinklers is mostly the result of the superimposition of the water amount of adjacent 2-6 sprinklers.

Based on hydraulic performance test results of the VRI system of the center pivot sprinkler irrigation system, there is a transition zone of a certain length between adjacent management sub-zones due to different irrigation depths. In the truss direction of the sprinkler irrigation system, the transition zone of the R3000 sprinklers is 0-4 m long, and the transition zone of the D3000 sprinklers is 3-6 m long. In the travel direction of the sprinkler irrigation system, the length of the transition zone does not exceed 9 m. Considering the low uniformity of irrigation in the transition zone, it is not appropriate to set up too many management sub-zones.

Therefore, according to a sprinkler spacing of the sprinkler irrigation system and a spraying radius of the largest sprinkler, the minimum length of the VRI management zone along the truss direction of the sprinkler irrigation system is calculated as follows:

$$d = s \times \text{ROUNDUP}(r_{max}/s, 0)$$

where d denotes the minimum length of the VRI management zone along the truss direction of the sprinkler irrigation system, s denotes the sprinkler spacing of the sprinkler irrigation system, $r_{max}$ denotes the spraying radius of the largest sprinkler, and ROUNDUP(·) denotes a function of rounding up to zero.

In this embodiment, for the R3000 rotary sprinklers, the minimum length of the management sub-zone is 6 times the sprinkler spacing along the truss direction of the sprinkler irrigation system. For the D3000 scattering sprinklers, the minimum length of the management sub-zone is 4 times the sprinkler spacing along the truss direction of the sprinkler irrigation system.

S2. According to a distribution range of the spraying amount of the sprinkler irrigation system, a minimum angle of the VRI management zone along a travel direction of the sprinkler irrigation system is determined.

In an optional embodiment of the present disclosure, when the center pivot sprinkler irrigation system is in a static state, the distribution range of the spraying amount of the sprinkler irrigation system can be approximated to a sector with the center pivot as the center. The sector angle is calculated based on the spraying radius of the farthest sprinkler from the center pivot and the distance between the farthest sprinkler and the center pivot, which is the minimum angle of the management sub-zone along the travel direction of the sprinkler irrigation system.

Therefore, according to a spraying radius of the farthest sprinkler of the sprinkler irrigation system from a center pivot and the distance between the farthest sprinkler from the center pivot and the center pivot, the minimum angle of the VRI management zone along the travel direction of the sprinkler irrigation system is calculated as follows:

$$\theta = 2 \times \tan^{-1}\frac{r}{L}$$

where θ denotes the minimum angle of the VRI management zone along the travel direction of the sprinkler irrigation system, r denotes the spraying radius of the farthest sprinkler from the center pivot, and L denotes the distance between the farthest sprinkler from the center pivot and the center pivot. In particular, considering that the minimum control accuracy of the sprinkler irrigation system's operating angle is 2°, θ is an integral multiple of 2°.

S3. According to the minimum length of the VRI management zone along the truss direction of the sprinkler irrigation system and the minimum angle of the VRI management zone along the travel direction of the sprinkler irrigation system, the VRI management zone is divided to generate a VRI management zoning map.

In an optional embodiment of the present disclosure, along the truss direction of the sprinkler irrigation system, according to the minimum length of the VRI management zone along the truss direction of the sprinkler irrigation system and the total quantity of the sprinklers of the sprinkler irrigation system, the quantity of circles divided in the VRI management zone along the truss direction of the sprinkler irrigation system is calculated, that is, the first quantity:

$$n = \text{ROUNDDOWN}(m/d, 0)$$

where n denotes the first quantity, m denotes the total quantity of sprinklers of the sprinkler irrigation system, d denotes the minimum length of the VRI management zone along the truss direction of the sprinkler irrigation system, and ROUNDDOWN(·) denotes a function of rounding down to zero. For the R3000 sprinklers, d=6s; for the D3000 sprinklers, d=4s, s being the sprinkler spacing. If m cannot be divided by d, the length of the last circle is the overall length of the sprinkler irrigation system.

After the quantity of the circles is acquired, by centering on the center pivot of the sprinkler irrigation system, equidistant circles of the first quantity are drawn in the VRI management zone along the truss direction of the sprinkler irrigation system.

According to the minimum angle of the VRI management zone along the travel direction of the sprinkler irrigation system and the travel angle corresponding to the control area of the sprinkler irrigation system, the number of sectors divided along the travel direction of the sprinkler irrigation system, that is, the second quantity is calculated:

$$k = \text{ROUNDDOWN}(\alpha/\theta, 0)$$

where k denotes the second quantity, α denotes a travel angle corresponding to a control area of the sprinkler irrigation system, θ denotes the minimum angle of the VRI management zone along the travel direction of the sprinkler irrigation system, and ROUNDDOWN(·) denotes a function of rounding down to zero. If α cannot be divided by θ, then α/K is the minimum angle of the VRI management zone along the travel direction of the sprinkler irrigation system.

After the quantity of the sectors is acquired, radii of a second quantity are drawn at equal angles in the VRI management zone along the travel direction of the sprinkler irrigation system.

Figure 2:
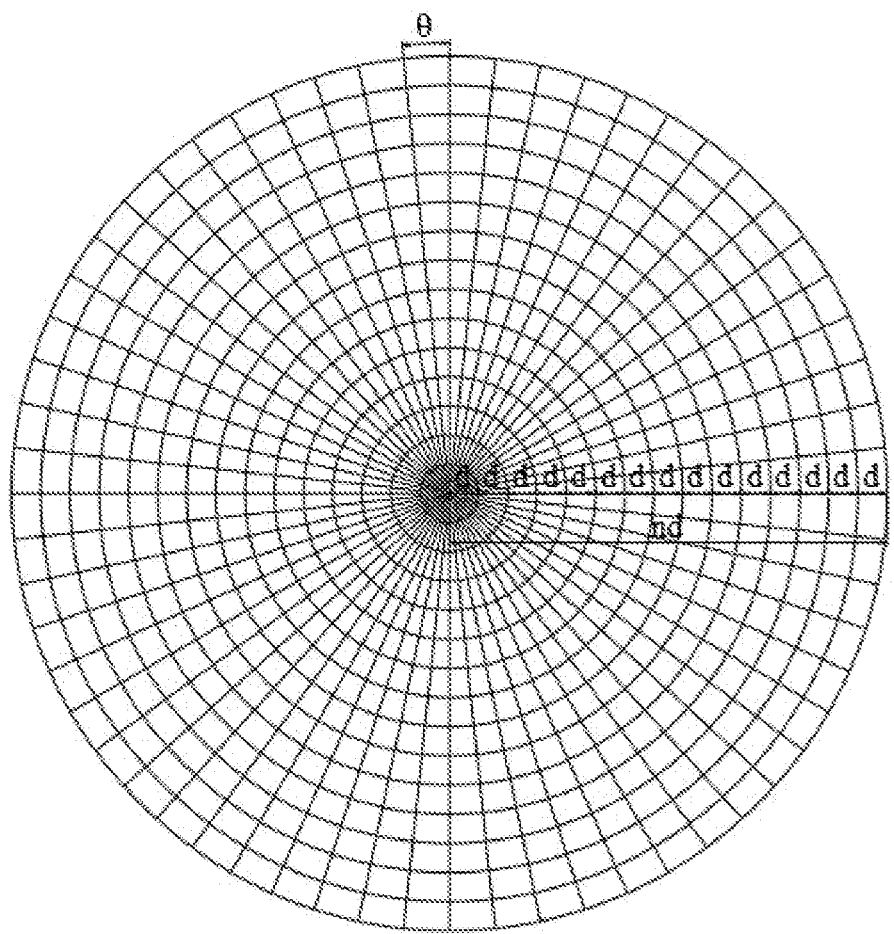
FIG. 2 is a schematic diagram of a VRI management zoning map according to Embodiment 1 of the present disclosure.

The VRI management zone is divided by the circles of the first quantity and the radii of the second quantity into sectors of a quantity equal to a product of the first quantity and the second quantity, that is, n×k minimum management sub-zones, as shown in FIG. 2.

Taking a three span+boom center pivot sprinkler irrigation system as an example, the sprinkler irrigation system is 150 m long, is provided with D3000 scattering sprinklers with a spacing of 2.5 m, and has a control area defined by a full circle (360°). Through calculation, the minimum length of the management sub-zone is 10 m, and the minimum angle is 6°. 15 circles are drawn along the truss direction of the sprinkler irrigation system, and 60 sectors are equally divided along the travel direction of the sprinkler irrigation system. Therefore, there are 900 minimum management sub-zones.

S4. According to a basic irrigation amount of VRI management and a spatial distribution map of crop water deficit or a spatial distribution map of soil water holding capacity (SWHC), an irrigation quota of each management sub-zone is determined. According to a distribution map of irrigation quotas of all management sub-zones in combination with a travel speed of the sprinkler irrigation system and a duty cycle of a solenoid valve, the VRI prescription map is generated.

In an optional embodiment of the present disclosure, the basic irrigation amount of VRI management is determined as follows:

The average clay content $\overline{\text{Clay}}$ in the whole control area of the sprinkler irrigation system or the control area of each management sub-zone is calculated.

$$\overline{\text{Clay}} = \sum_{i=1}^{n} \text{Clay}_i,$$

where n denotes the quantity of clay content measuring points in the whole control area of the sprinkler irrigation system or the control area of each management sub-zone and $\text{Clay}_i$ denotes the clay content of an i-th measuring point.

At least three positions are selected from those with a clay content that is a set multiple of the average clay content (such as 1.1-1.2 times), and pin-type real-time transmission soil water sensors are placed at a depth of 20-40 cm in the root zone of the crop. Irrigation is started when the soil water content measured by the soil water sensor reaches the lower limiting irrigation level. According to the Penman-Monteith equation and crop coefficient recommended by the Food and Agricultural Organization of the United States (FAO) Irrigation and Drainage Paper No. 56 (FAO-56), the water consumed by the crop in the interval between two irrigation times is calculated as the basic irrigation amount I for VRI management:

$$I = K_c \times ET_0,$$

where I denotes the basic irrigation amount; $K_c$ denotes the crop coefficient, which adopts the value recommended by FAO-56; $ET_0$ denotes reference evapotranspiration, which is calculated by the Penman-Monteith equation recommended by FAO-56:

$$ET_0 = \frac{0.408\Delta(R_n - G) + \gamma \frac{900}{T + 273} u_2(e_s - e_a)}{\Delta + \gamma(1 + 0.43u_2)},$$

where $R_n$ denotes a surface net radiation, G denotes a soil heat flux density, T denotes a daily average temperature at a height of 2 m, $u_2$ denotes an airspeed at 2 m, $e_s$ denotes a saturation vapor pressure, $e_a$ denotes an actual vapor pressure, $e_s - e_a$ denotes a saturation vapor pressure difference, Δ denotes a slope of a saturation vapor pressure curve, and γ denotes a hygrometer constant.

The present disclosure can generate VRI prescription maps respectively based on the spatial distribution map of crop water deficit acquired by a UAV-based thermal imaging system, the spatial distribution map of crop water deficit acquired by a ground-based sensor system, and the spatial distribution map of the SWHC acquired by a grid sampling method. These generation processes are described in detail below.

In this embodiment, a VRI prescription map is generated according to the spatial distribution map of crop water deficit acquired by the UAV-based thermal imaging system.

According to a field canopy temperature image acquired by a UAV-based thermal imaging system, the spatial distribution map of crop water deficit is generated.

According to coordinate positions, the spatial distribution map of crop water deficit and the VRI management zoning map are superimposed by taking the VRI management zoning map as a base map.

Clustering is performed according to an average value of a water deficit index of each minimum management sub-zone, and a product of an average value of upper and lower limits of each category of water deficit index and the basic irrigation amount is calculated as the irrigation quota of the management sub-zone.

Within the same sector angle along the travel direction of the sprinkler irrigation system, the travel speed of the sprinkler irrigation system is determined according to a maximum irrigation quota of all the management sub-zones, and the duty cycle of the solenoid valve is determined according to the irrigation quota of other management sub-zone.

According to the distribution map of irrigation quotas of all the management sub-zones in combination with the travel speed of the sprinkler irrigation system and the duty cycle of the solenoid valve, the VRI prescription map is generated.

Specifically, the UAV-based thermal imaging system acquires multiple images of field canopy temperature, and the water deficit index normalized relative canopy temperature (NRCT) is calculated through image stitching software:

$$NRCT = \frac{T - T_{min}}{T_{max} - T_{min}},$$

where T denotes the canopy temperature of each picture element in a field, $T_{max}$ denotes the highest canopy temperature in the field, and $T_{min}$ denotes the lowest canopy temperature in the field.

In this way, the spatial distribution map of the NRCT with a high degree of dispersion can be directly acquired through the image stitching software.

The VRI management zoning map composed of n×k sectors is taken as the base map, and the spatial distribution map of the NRCT is superimposed with the base map according to the coordinate positions.

An average value of the NRCT of each minimum management sub-zone is calculated. All average values are divided into 2-7 categories according to a k-means clustering method, and each category belongs to a different NRCT range. In the same category of management sub-zone, the product of the average value of the upper and lower limits of the NRCT range and the basic irrigation amount I forms the irrigation quota of this category of management sub-zone. The distribution map is formed by the irrigation quotas of all the management sub-zones.

At the same sector angle θ along the travel direction of the sprinkler irrigation system, the travel speed of the sprinkler irrigation system is determined according to the maximum irrigation quota of the n management sub-zones:

$$v = \frac{I_0}{I_m} \times 100,$$

where v denotes the travel speed of the sprinkler irrigation system, $I_0$ denotes the irrigation depth when the travel speed of the sprinkler irrigation system is 100%, and $I_m$ denotes the maximum irrigation quota of the n management sub-zones.

According to the irrigation quotas of other n−1 management sub-zones, the duty cycle of the solenoid valve is determined, which is a percentage of the opening time of the solenoid valve to an opening and closing cycle of the solenoid valve:

$$C = \frac{I_i}{I_m} \times 100,$$

where C denotes the duty cycle of the solenoid valve, $I_i$ denotes the irrigation quota of the i-th management sub-zone of the n management sub-zones, and $I_m$ denotes the maximum irrigation quota of the n management sub-zones.

The travel speed v of the sprinkler irrigation system in k sector management sub-zones and the duty cycle C of the solenoid valve in the n×k sectors form a set of control commands, which are combined with the distribution map of irrigation quotas of all the management sub-zones to generate the VRI prescription map.

In this embodiment, the VRI prescription map is generated according to the spatial distribution map of crop water deficit acquired by a ground-based sensor system:

According to linear scatter values of a canopy temperature acquired by an infrared temperature sensor system aboard the sprinkler irrigation system, the spatial distribution map of crop water deficit is generated.

The spatial distribution map of crop water deficit is classified by a natural breakpoint method, and according to coordinate positions, the spatial distribution map of crop water deficit and the VRI management zoning map are superimposed by taking the VRI management zoning map as a base map.

It is determined whether each minimum management sub-zone belongs to the same category of water deficit. If yes, a product of an average value of upper and lower limits of a water deficit index and the basic irrigation amount is calculated as the irrigation quota of the minimum management sub-zone. If not, the irrigation quota of the minimum management sub-zone is calculated according to a category of water deficit with the largest area proportion.

Within the same sector angle along the travel direction of the sprinkler irrigation system, the travel speed of the sprinkler irrigation system is determined according to a maximum irrigation quota of all the management sub-zones, and the duty cycle of the solenoid valve is determined according to the irrigation quota of other management sub-zone.

According to the distribution map of irrigation quotas of all the management sub-zones in combination with the travel speed of the sprinkler irrigation system and the duty cycle of the solenoid valve, the VRI prescription map is generated.

Specifically, the infrared temperature sensor system aboard the sprinkler irrigation system acquires the linear scatter values of the canopy temperature. According to a time scale transformation equation, the canopy temperature is converted to a time point with the highest atmospheric temperature, and the water deficit index NRCT at all scattered points is calculated.

$$NRCT = \frac{T - T_{min}}{T_{max} - T_{min}},$$

where T denotes the canopy temperature of each picture element in a field, $T_{max}$ denotes the highest canopy temperature in the field, and $T_{min}$ denotes the lowest canopy temperature in the field.

The spatial distribution map of the NRCT with a high degree of clustering is generated after interpolation by ArcGIS software.

Optionally, an electrical conductivity (EC) system aboard a tractor acquires linear scatter values of soil EC, which are interpolated by ArcGIS software to generate the spatial distribution map of the EC with a high degree of clustering.

The spatial distribution map of the NRCT or the spatial distribution map of the EC is divided into 2-7 categories by a "Jenks" natural breakpoint method and is superimposed with the VRI management zoning map formed by the n×k sectors according to the coordinate positions.

It is determined whether each minimum management sub-zone belongs to the same category of water deficit. If yes, a product of an average value of the upper and lower limits of the NRCT/EC range in the minimum management sub-zone and the basic irrigation amount as the irrigation quota of the management sub-zone. If not, the irrigation quota of the minimum management sub-zone is calculated according to a category of water deficit with the largest area proportion. The irrigation quotas of all the management sub-zones form the distribution map.

At the same sector angle θ along the travel direction of the sprinkler irrigation system, the travel speed of the sprinkler irrigation system is determined according to the maximum irrigation quota of the n management sub-zones:

$$v = \frac{I_0}{I_m} \times 100,$$

where v denotes the travel speed of the sprinkler irrigation system, $I_0$ denotes the irrigation depth when the travel speed of the sprinkler irrigation system is 100%, and $I_m$ denotes the maximum irrigation quota of the n management sub-zones.

According to the irrigation quotas of other n−1 management sub-zones, the duty cycle of the solenoid valve is determined, which is a percentage of the opening time of the solenoid valve to an opening and closing cycle of the solenoid valve:

$$C = \frac{I_i}{I_m} \times 100,$$

where C denotes the duty cycle of the solenoid valve, $I_i$ denotes the irrigation quota of the i-th management sub-zone of the n management sub-zones, and $I_m$ denotes the maximum irrigation quota of the n management sub-zones.

The travel speed v of the sprinkler irrigation system in k sector management sub-zones and the duty cycle C of the solenoid valve in the n×k sectors form a set of control commands, which are combined with the distribution map of irrigation quotas of all the management sub-zones to generate the VRI prescription map.

In this embodiment, a VRI prescription map is generated based on the spatial distribution map of the SWHC acquired by the grid sampling method.

A SAWC is acquired by a grid sampling method, and according to the acquired SAWC, the spatial distribution map of the SWHC is generated.

The spatial distribution map of the SWHC is classified by a natural breakpoint method, and according to coordinate positions, the spatial distribution map of the SWHC and the VRI management zoning map are superimposed by taking the VRI management zoning map as a base map.

A control area of the same category of SWHC is defined by a management sub-zone occupied by the same category of SWHC, and according to an average clay content in the control area, a soil water sensor is provided in a root zone of a crop.

Irrigation is started when a soil water content measured by the soil water sensor in any category of control area reaches a lower limiting irrigation level, and according to a difference between an upper limiting irrigation level and the measured soil water content, an irrigation quota of the control area is calculated.

It is determined whether each minimum management sub-zone belongs to the same category of SWHC. If yes, the irrigation quota of the control area is taken as the irrigation quota of the minimum management sub-zone. If not, the irrigation quota of a category of water deficit with the largest area proportion is taken as the irrigation quota of the minimum management sub-zone.

Within the same sector angle along the travel direction of the sprinkler irrigation system, the travel speed of the sprinkler irrigation system is determined according to a maximum irrigation quota of all the management sub-zones, and the duty cycle of the solenoid valve is determined according to the irrigation quota of other management sub-zone.

According to the distribution map of irrigation quotas of all the management sub-zones in combination with the travel speed of the sprinkler irrigation system and the duty cycle of the solenoid valve, the VRI prescription map is generated.

Specifically, the SAWC is acquired by the grid sampling method and interpolated by ArcGIS software to generate the spatial distribution map of the SAWC with a high degree of clustering.

The spatial distribution map of the SAWC is divided into 2-7 categories by the "Jenks" natural breakpoint method and is superimposed with the VRI management zoning map formed by the n×k sectors according to the coordinate positions. The control area is defined by management sub-zones occupied by the same category of SWHC.

The average clay content $\overline{\text{Clay}}$ is calculated as follows:

$$\overline{\text{Clay}} = \sum_{i=1}^{n} \text{Clay}_i / n$$

where n denotes the quantity of clay content measuring points in the control area of the same category of management sub-zone, and $\text{Clay}_i$ denotes the clay content of an i-th measuring point.

At least three positions are selected from those with a clay content that is a set multiple of the average clay content (such as 1.1-1.2 times), and pin-type real-time transmission soil water sensors are placed at a depth of 20-40 cm in the root zone of the crop. Irrigation is started when the soil water content measured by the soil water sensor reaches the lower limiting irrigation level. Irrigation is started when the soil water content measured by any soil water sensor reaches the lower limiting irrigation level. According to the difference between the upper limiting irrigation level and the measured soil water content measured in the management sub-zone within the control area, the irrigation quota of the control area is calculated.

It is determined whether each minimum management sub-zone belongs to the same category of SWHC. If yes, the irrigation quota of the control area is taken as the irrigation quota of the minimum management sub-zone. If not, the irrigation quota of a category of water deficit with the largest area proportion is taken as the irrigation quota of the minimum management sub-zone. The irrigation quotas of all the management sub-zones form the distribution map.

At the same sector angle θ along the travel direction of the sprinkler irrigation system, the travel speed of the sprinkler irrigation system is determined according to the maximum irrigation quota of the n management sub-zones:

$$v = \frac{I_0}{I_m} \times 100,$$

where v denotes the travel speed of the sprinkler irrigation system, $I_0$ denotes the irrigation depth when the travel speed of the sprinkler irrigation system is 100%, and $I_m$ denotes the maximum irrigation quota of the n management sub-zones.

According to the irrigation quotas of other n−1 management sub-zones, the duty cycle of the solenoid valve is determined, which is a percentage of the opening time of the solenoid valve to an opening and closing cycle of the solenoid valve:

$$C = \frac{I_i}{I_m} \times 100,$$

where C denotes the duty cycle of the solenoid valve, $I_i$ denotes the irrigation quota of the i-th management sub-zone of the n management sub-zones, and $I_m$ denotes the maximum irrigation quota of the n management sub-zones.

The travel speed v of the sprinkler irrigation system in k sector management sub-zones and the duty cycle C of the solenoid valve in the n×k sectors form a set of control commands, which are combined with the distribution map of irrigation quotas of all the management sub-zones to generate the VRI prescription map.

Embodiment 2

Figure 3:
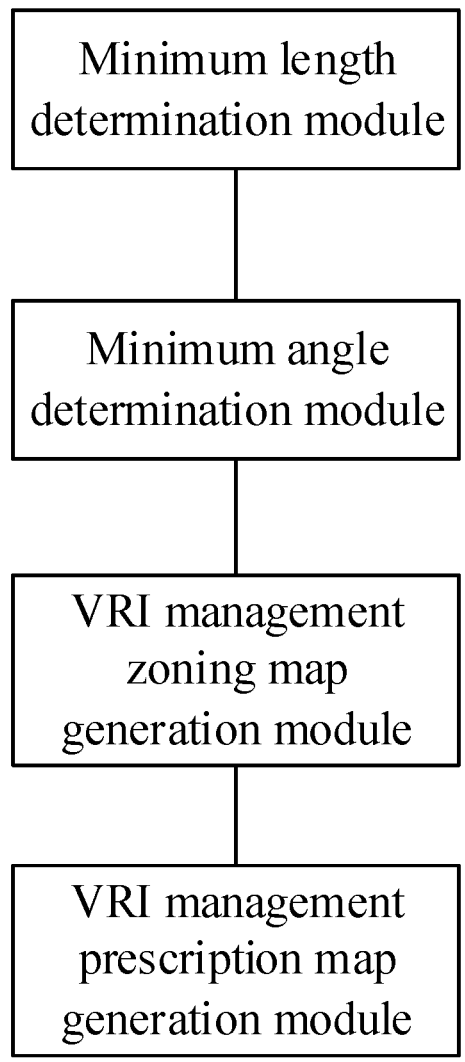
FIG. 3 is a structural diagram of a system for generating a VRI prescription map for a large sprinkler irrigation system according to Embodiment 2 of the present disclosure.

As shown in FIG. 3, the present disclosure further proposes a system for generating a VRI prescription map for a large sprinkler irrigation system using the method according to Embodiment 1 and including:

a minimum length determination module configured to determine, according to sprinkler information of the sprinkler irrigation system, a minimum length of a VRI management zone along a truss direction of the sprinkler irrigation system;

a minimum angle determination module configured to determine, according to a distribution range of a spraying amount of the sprinkler irrigation system, a minimum angle of the VRI management zone along a travel direction of the sprinkler irrigation system;

a VRI management zoning map generation module configured to divide, according to the minimum length of the VRI management zone along the truss direction of the sprinkler irrigation system and the minimum angle of the VRI management zone along the travel direction of the sprinkler irrigation system, the VRI management zone to generate a VRI management zoning map; and a VRI prescription map generation module, configured to determine, according to a basic irrigation amount of VRI management and a spatial distribution map of crop water deficit or a spatial distribution map of SWHC, an irrigation quota of each management sub-zone; and generate, according to a distribution map of irrigation quotas of all management sub-zones in combination with a travel speed of the sprinkler irrigation system and a duty cycle of a solenoid valve, the VRI prescription map.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

In this specification, specific embodiments are used to describe the principle and implementations of the present disclosure, and the description of the embodiments is only intended to help understand the method and core idea of the present disclosure. Meanwhile, a person of ordinary skill in the art may make modifications with respect to the specific implementations and the application scope based on the idea of the present disclosure. Therefore, the content of this specification shall not be construed as a limitation to the present disclosure.

Those of ordinary skill in the art will understand that the embodiments described herein are intended to help readers understand the principles of the present disclosure, and it should be understood that the protection scope of the present disclosure is not limited to such special statements and embodiments. Those of ordinary skill in the art may make other various specific modifications and combinations according to the technical teachings disclosed in the present disclosure without departing from the essence of the present disclosure, and such modifications and combinations still fall within the protection scope of the present disclosure.

What is claimed is:

1. A method for implementing a variable rate irrigation (VRI) prescription map for a sprinkler irrigation system, comprising the following steps:

determining, according to sprinkler information of the sprinkler irrigation system, a minimum length of a VRI management zone along a truss direction of the sprinkler irrigation system;

determining, according to a distribution range of a spraying amount of the sprinkler irrigation system, a minimum angle of the VRI management zone along a travel direction of the sprinkler irrigation system;

dividing, according to the minimum length of the VRI management zone along the truss direction of the sprinkler irrigation system and the minimum angle of the VRI management zone along the travel direction of the sprinkler irrigation system, the VRI management zone to generate a VRI management zoning map;

determining, according to a basic irrigation amount of VRI management and a spatial distribution map of crop water deficit or a spatial distribution map of soil water holding capacity (SWHC), an irrigation quota of each management sub-zone and generating, according to a distribution map of irrigation quotas of all management sub-zones in combination with a travel speed of the sprinkler irrigation system and a duty cycle of a solenoid valve, the VRI prescription map;

controlling, based on the VRI prescription map, the travel speed of the sprinkler irrigation system and an irrigation depth in each management zone corresponding to the VRI prescription map, said VRI map providing a set of coding instructions in accordance with which the controlling is implemented.

2. The method according to claim 1, wherein the step of determining, according to the sprinkler information of the sprinkler irrigation system, the minimum length of the VRI management zone along the truss direction of the sprinkler irrigation system comprises:

calculating, according to a sprinkler spacing of the sprinkler irrigation system and a spraying radius of a largest sprinkler, the minimum length of the VRI management zone along the truss direction of the sprinkler irrigation system:

$$d = s \times \text{ROUNDUP}(r_{max}/s, 0)$$

wherein d denotes the minimum length of the VRI management zone along the truss direction of the sprinkler irrigation system, s denotes the sprinkler spacing of the sprinkler irrigation system, $r_{max}$ denotes the spraying radius of the largest sprinkler, and ROUNDUP(·) denotes a function of rounding up to zero.

3. The method according to claim 1, wherein the step of determining, according to the distribution range of the spraying amount of the sprinkler irrigation system, the minimum angle of the VRI management zone along the travel direction of the sprinkler irrigation system comprises:

calculating, according to a spraying radius of a farthest sprinkler of the sprinkler irrigation system from a center pivot and a distance between the farthest sprinkler from the center pivot and the center pivot, the minimum angle of the VRI management zone along the travel direction of the sprinkler irrigation system:

$$\theta = 2 \times \tan^{-1} \frac{r}{L},$$

wherein θ denotes the minimum angle of the VRI management zone along the travel direction of the sprinkler irrigation system, r denotes the spraying radius of the farthest sprinkler from the center pivot, and L denotes the distance between the farthest sprinkler from the center pivot and the center pivot.

4. The method according to claim 1, wherein the step of dividing, according to the minimum length of the VRI management zone along the truss direction of the sprinkler irrigation system and the minimum angle of the VRI management zone along the travel direction of the sprinkler irrigation system, the VRI management zone to generate the VRI management zoning map comprises:

drawing, by centering on the center pivot of the sprinkler irrigation system, equidistant circles of a first quantity in the VRI management zone along the truss direction of the sprinkler irrigation system;

drawing equal-angle radii of a second quantity in the VRI management zone along the travel direction of the sprinkler irrigation system; and dividing, by the equidistant circles of the first quantity and the equal-angle radii of the second quantity, the VRI management zone into minimum management sub-zones of a quantity equal to a product of the first quantity and the second quantity.

5. The method according to claim 4, wherein the first quantity is calculated as follows:

$$n = \text{ROUNDDOWN}(m/d, 0)$$

wherein n denotes the first quantity, m denotes a total quantity of sprinklers of the sprinkler irrigation system, d denotes the minimum length of the VRI management zone along the truss direction of the sprinkler irrigation system, and ROUNDDOWN(·) denotes a function of rounding down to zero.

6. The method according to claim 4, wherein the second quantity is calculated as follows:

$$k = \text{ROUNDDOWN}(\alpha/\theta, 0)$$

wherein k denotes the second quantity, α denotes a travel angle corresponding to a control area of the sprinkler irrigation system, θ denotes the minimum angle of the VRI management zone along the travel direction of the sprinkler irrigation system, and ROUNDDOWN(·) denotes a function of rounding down to zero.

7. The method according to claim 1, wherein the step of determining, according to the basic irrigation amount of VRI management and the spatial distribution map of crop water deficit or the spatial distribution map of SWHC, the irrigation quota of each management sub-zone and generating, according to the distribution map of irrigation quotas of all management sub-zones in combination with the travel speed of the sprinkler irrigation system and the duty cycle of the solenoid valve, the VRI prescription map comprises:

providing, according to an average clay content in a whole control area of the sprinkler irrigation system, a soil water sensor in a root zone of a crop;

starting irrigation when a soil water content measured by the soil water sensor reaches a lower limiting irrigation level and calculating a water consumption of the crop in an interval between two irrigation times as the basic irrigation amount for VRI management;

generating, according to a field canopy temperature image acquired by an unmanned aerial vehicle (UAV)-based thermal imaging system, the spatial distribution map of crop water deficit;

superimposing, according to coordinate positions, the spatial distribution map of crop water deficit and the VRI management zoning map by taking the VRI management zoning map as a base map;

clustering according to an average value of a water deficit index of each minimum management sub-zone and calculating a product of an average value of upper and lower limits of each category of water deficit index and the basic irrigation amount as the irrigation quota of the management sub-zone;

determining, within a same sector angle along the travel direction of the sprinkler irrigation system, the travel speed of the sprinkler irrigation system according to a maximum irrigation quota of all the management sub-zones and the duty cycle of the solenoid valve according to the irrigation quota of other management sub-zone; and generating, according to the distribution map of irrigation quotas of all the management sub-zones in combination with the travel speed of the sprinkler irrigation system and the duty cycle of the solenoid valve, the VRI prescription map.

8. The method according to claim 1, wherein the step of determining, according to the basic irrigation amount of VRI management and the spatial distribution map of crop water deficit or the spatial distribution map of SWHC, the irrigation quota of each management sub-zone and generating, according to the distribution map of irrigation quotas of all management sub-zones in combination with the travel speed of the sprinkler irrigation system and the duty cycle of the solenoid valve, the VRI prescription map comprises:

providing, according to an average clay content in a whole control area of the sprinkler irrigation system, a soil water sensor in a root zone of a crop;

starting irrigation when a soil water content measured by the soil water sensor reaches a lower limiting irrigation level and calculating a water consumption of the crop in an interval between two irrigation times as the basic irrigation amount for VRI management;

generating, according to linear scatter values of a canopy temperature acquired by an infrared temperature sensor system aboard the sprinkler irrigation system, the spatial distribution map of crop water deficit;

classifying the spatial distribution map of crop water deficit by a natural breakpoint method, and superimposing, according to coordinate positions, the spatial distribution map of crop water deficit and the VRI management zoning map by taking the VRI management zoning map as a base map;

determining whether each minimum management sub-zone belongs to a same category of water deficit; calculating, when each minimum management sub-zone belongs to the same category of water deficit, a product of an average value of upper and lower limits of a water deficit index and the basic irrigation amount as the irrigation quota of the minimum management sub-zone; and calculating, when each minimum management sub-zone does not belong to the same category of water deficit, the irrigation quota of the minimum management sub-zone according to a category of water deficit with a largest area proportion;

determining, within a same sector angle along the travel direction of the sprinkler irrigation system, the travel speed of the sprinkler irrigation system according to a maximum irrigation quota of all the management sub-zones and the duty cycle of the solenoid valve according to the irrigation quota of other management sub-zone; and generating, according to the distribution map of irrigation quotas of all the management sub-zones in combination with the travel speed of the sprinkler irrigation system and the duty cycle of the solenoid valve, the VRI prescription map.

9. The method according to claim 1, wherein the step of determining, according to the basic irrigation amount of VRI management and the spatial distribution map of crop water deficit or the spatial distribution map of SWHC, the irrigation quota of each management sub-zone and generating, according to the distribution map of irrigation quotas of all management sub-zones in combination with the travel speed of the sprinkler irrigation system and the duty cycle of the solenoid valve, the VRI prescription map comprises:

acquiring, by a grid sampling method, a soil available water content (SAWC); and generating, according to the SAWC, the spatial distribution map of the SWHC;

classifying the spatial distribution map of the SWHC by a natural breakpoint method, and superimposing, according to coordinate positions, the spatial distribution map of the SWHC and the VRI management zoning map by taking the VRI management zoning map as a base map;

defining a control area of a same category of SWHC by a management sub-zone occupied by a same category of SWHC and providing, according to an average clay content in the control area, a soil water sensor in a root zone of a crop;

starting irrigation when a soil water content measured by the soil water sensor in any category of control area reaches a lower limiting irrigation level and calculating, according to a difference between an upper limiting irrigation level and the soil water content, an irrigation quota of the control area;

determining whether each minimum management sub-zone belongs to a same category of SWHC; taking, when each minimum management sub-zone belongs to a same category of SWHC, the irrigation quota of the control area as the irrigation quota of the minimum management sub-zone; and taking, when each minimum management sub-zone does not belong to a same category of SWHC, the irrigation quota of a category of water deficit with a largest area proportion as the irrigation quota of the minimum management sub-zone;

determining, within a same sector angle along the travel direction of the sprinkler irrigation system, the travel speed of the sprinkler irrigation system according to a maximum irrigation quota of all the management sub-zones and the duty cycle of the solenoid valve according to the irrigation quota of other management sub-zone; and generating, according to the distribution map of irrigation quotas of all the management sub-zones in combination with the travel speed of the sprinkler irrigation system and the duty cycle of the solenoid valve, the VRI prescription map.

\* \* \* \* \*